US011999046B2

(12) United States Patent
Lin

(10) Patent No.: US 11,999,046 B2
(45) Date of Patent: Jun. 4, 2024

(54) COMBINED SCREWDRIVER WITH STORAGE STRUCTURE

(71) Applicant: YIH CHENG FACTORY CO., LTD., Nantuo (TW)

(72) Inventor: Jack Lin, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 93 days.

(21) Appl. No.: 17/511,260

(22) Filed: Oct. 26, 2021

(65) Prior Publication Data

US 2023/0129361 A1 Apr. 27, 2023

(51) Int. Cl.
*B25G 1/08* (2006.01)

(52) U.S. Cl.
CPC .................................... *B25G 1/085* (2013.01)

(58) Field of Classification Search
CPC ...................................................... B25G 1/085
USPC .................................................... 81/438, 490
See application file for complete search history.

(56) References Cited

U.S. PATENT DOCUMENTS

| | | | | | |
|---|---|---|---|---|---|
| 4,924,733 | A * | 5/1990 | McKenzie | B25B 15/02 81/439 |
| 5,265,504 | A * | 11/1993 | Fruhm | B25G 1/085 81/439 |
| 5,603,532 | A * | 2/1997 | Guest | F16B 13/0875 285/305 |
| 7,395,739 | B1 * | 7/2008 | Chen | B25G 1/085 81/439 |
| 8,590,432 | B2 * | 11/2013 | Wang | B25G 1/085 81/177.4 |
| 11,148,277 | B2 * | 10/2021 | Hu | B25B 23/16 |

* cited by examiner

*Primary Examiner* — Hadi Shakeri
(74) *Attorney, Agent, or Firm* — Chun-Ming Shih; HDLS IPR SERVICES

(57) ABSTRACT

The present disclosure is a combined screwdriver. A handle includes a cavity. A rod is arranged in the cavity, and the rod includes a positioning part. A storage assembly includes a storage seat and a stopper seat, and the storage assembly is sleeved on the rod. The storage seat includes a sleeve and a plurality of elastic clips, the sleeve may move out of the cavity. An abutting piece is fixed on the positioning part, and the abutting piece includes a plurality of elastic pieces. The plurality of elastic pieces elastically abuts the sleeve, and a cap covers the cavity.

5 Claims, 7 Drawing Sheets

COMBINED SCREWDRIVER WITH STORAGE STRUCTURE

BACKGROUND

Technical Field

The present disclosure is related to a hand tool, in particular to a combined screwdriver.

Description of Related Art

A function of a screwdriver is to turn a screw, and the screwdriver is one of a necessary hand tool in daily life. In addition, since various types and specifications of screws are quite diverse, a combined screwdriver product has emerged in order to provide users with different screwdriver heads according to different types of used screws.

Generally, the combined screwdriver may accommodate a plurality of screwdriver heads of different types and specifications in a handle to facilitate carrying and improve a convenience of operation. Furthermore, a current method used to fix the plurality of screwdriver heads is to set a rod in the handle. In addition, the storage seat is sleeved on the rod to fix the plurality of screwdriver heads. For this reason, the storage seat may be pulled out to replace for another screwdriver head.

In order to improve a stability of the storage seat when the storage seat is pulled out, an elastic piece is arranged between the storage seat and the rod for clamping and positioning, so as to prevent the storage seat from shaking during the storage seat is pulled out. However, for a combined screwdriver structure in related art, the elastic piece and the rod need to be combined by additional components, which results in cumbersome and inconvenient assembly procedures.

SUMMARY

A purpose of the present disclosure is to provide a combined screwdriver with storage structure to simplify an overall structure of a combined screwdriver.

In order to achieve the purpose above-mentioned, the present disclosure provides a combined screwdriver with storage structure, the combined screwdriver includes a handle, a rod, a storage assembly, an abutting piece, and a cap. The handle includes a cavity, a working end, and a storage end. The working end and the storage end are located on opposite sides of the cavity. The rod is arranged in the cavity, one end of the rod connects to the handle, and the other end of the rod includes a positioning part. The storage assembly is housed in the cavity, the storage assembly includes a storage seat and a stopper seat combined with one end of the storage seat. The stopper seat and the storage seat are jointly sleeve on the rod. The storage seat includes a sleeve and a plurality of elastic clips connected to the sleeve, and the sleeve is moved out of the cavity relative to the rod. The abutting piece is fixed on the positioning part of the rod, and the abutting piece includes a plurality of elastic pieces. One end of the plurality of elastic pieces elastically abuts against an inner surface of the sleeve. The cap detachably combines on the storage end, and covers the cavity.

Compared with some related arts, the combined screwdriver of the present disclosure is provided with a positioning part at one end of the rod, and the abutting piece is directly fixed to a screw hole of the rod through a screw, so that the plurality of elastic pieces of the abutting piece elastically abuts against the inner surface of the sleeve to improve the stability of the storage seat when the storage seat is pulled out from the handle. In addition, the stopper seat includes a plurality of concentric ring pieces with different diameters, and the stopper seat moves with the storage seat. An outer edge of the stopper seat will abut against an inner surface of the cavity and provide supporting force during a movement of the sleeve. Thereby increasing a stability during the movement. Furthermore, the positioning part is a card slot, the abutting piece includes a C-shaped buckle connecting the plurality of elastic pieces, and the abutting piece is fixed on the rod by the C-shaped buckle passing through the positioning part. To achieve the purpose of simplifying the overall structure of the combined screwdriver.

DETAILED DESCRIPTION

The technical content and detailed description of the present disclosure are now described with the drawings as follows. The present disclosure is not limited thereof.

Figure 1:
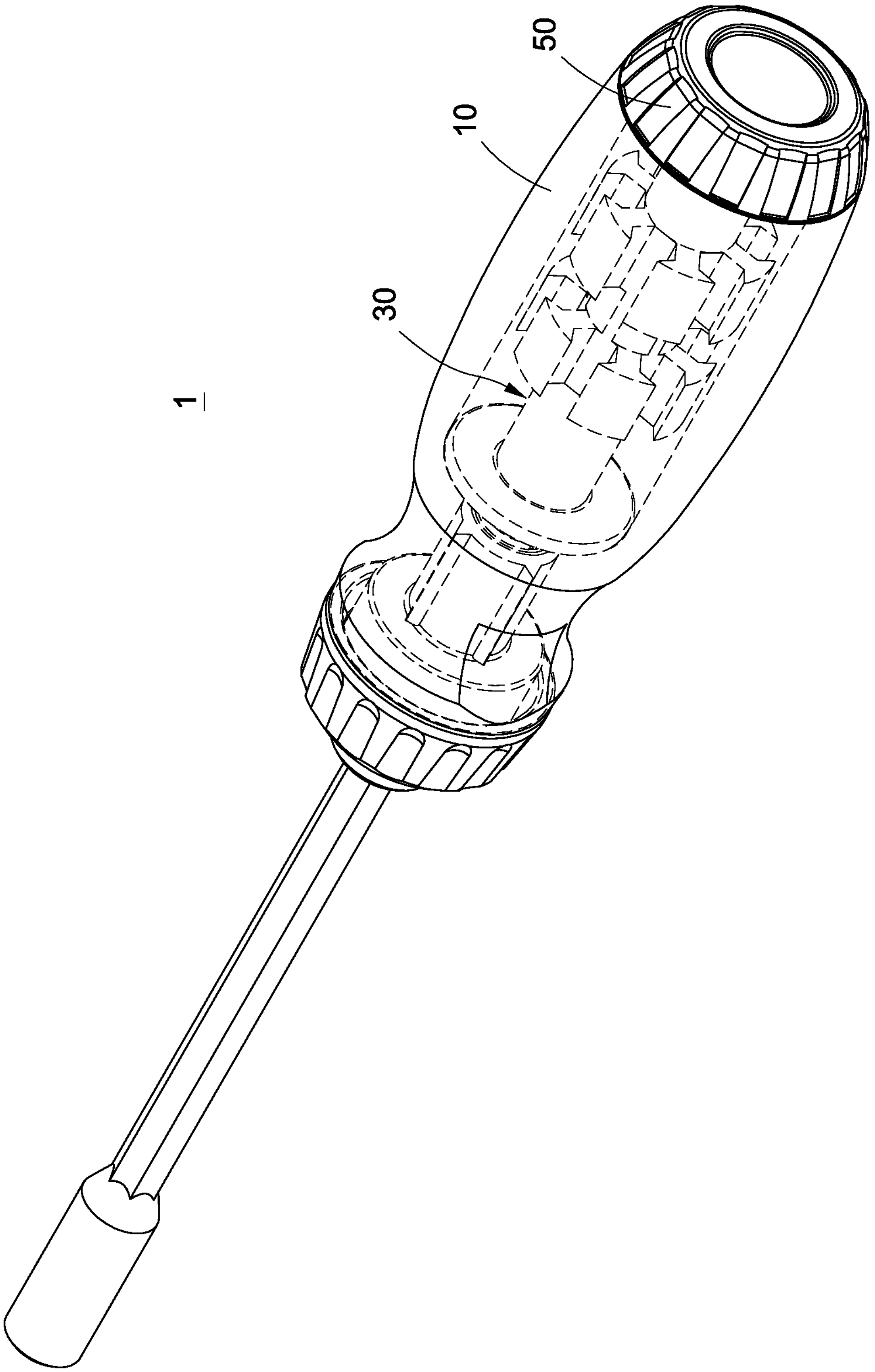
FIG. 1 is a perspective view of a combined screwdriver of the present disclosure.
Figure 2:
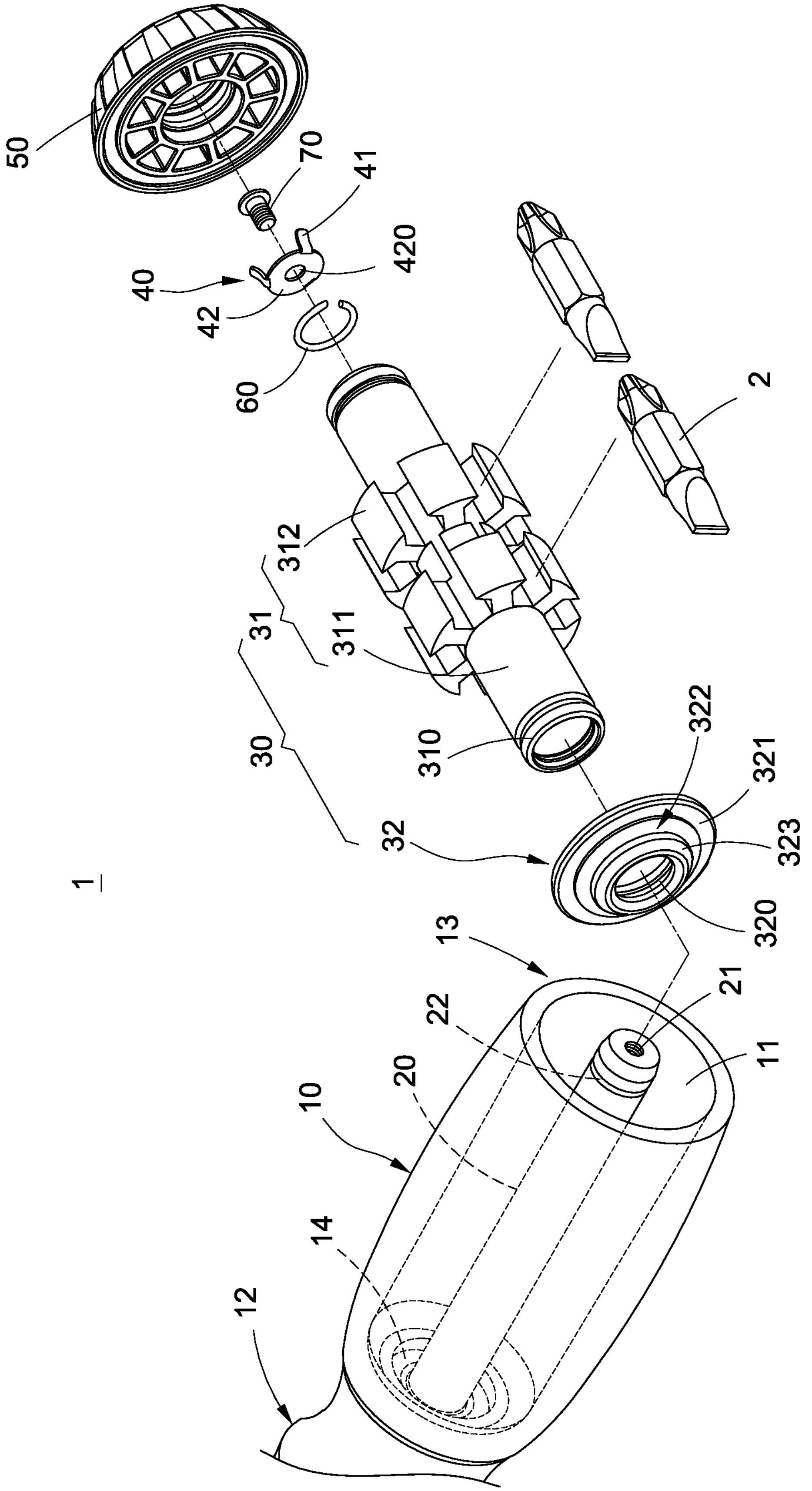
FIG. 2 is a perspective exploded schematic diagram of the combined screwdriver of the present disclosure.
Figure 3:
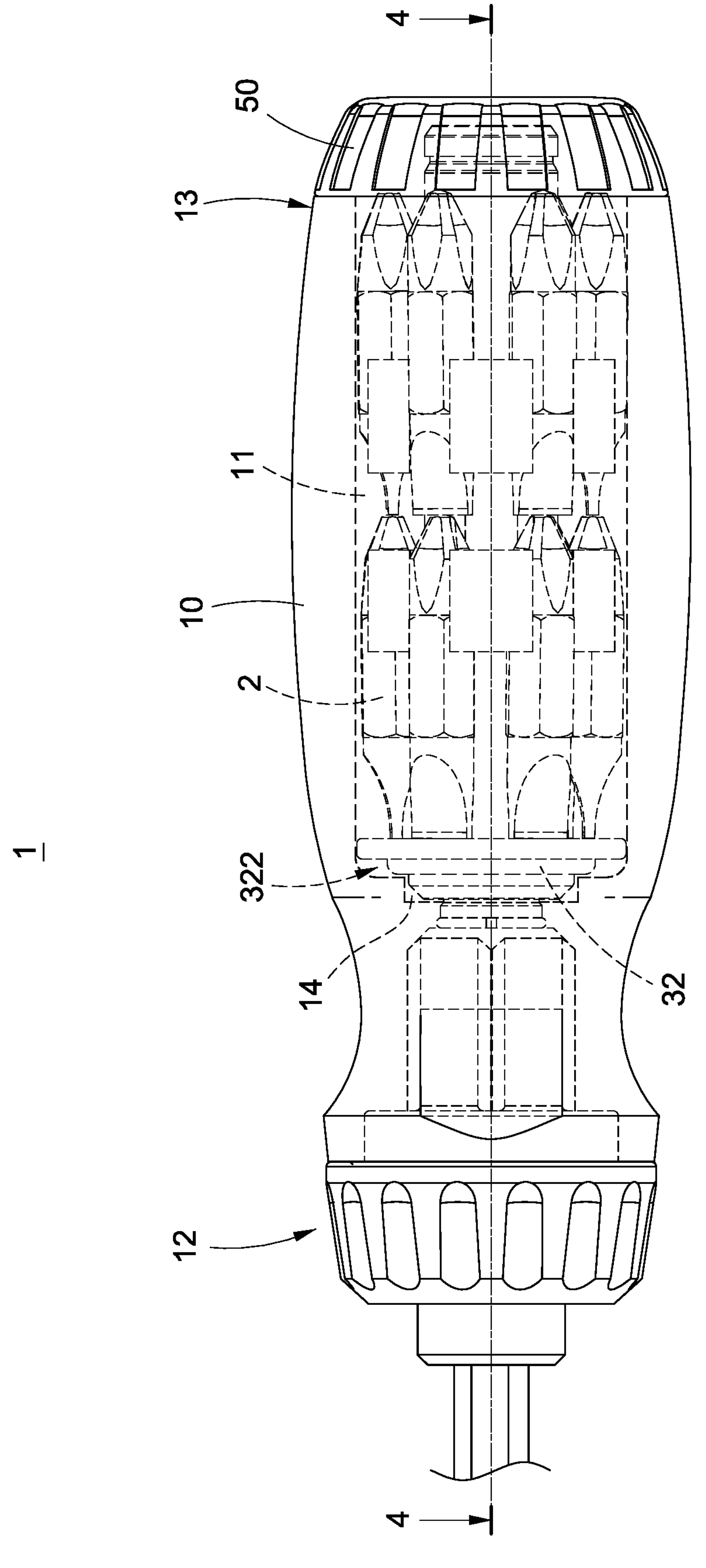
FIG. 3 is a schematic plan view of the combined screwdriver of the present disclosure after being assembled.
Figure 4:
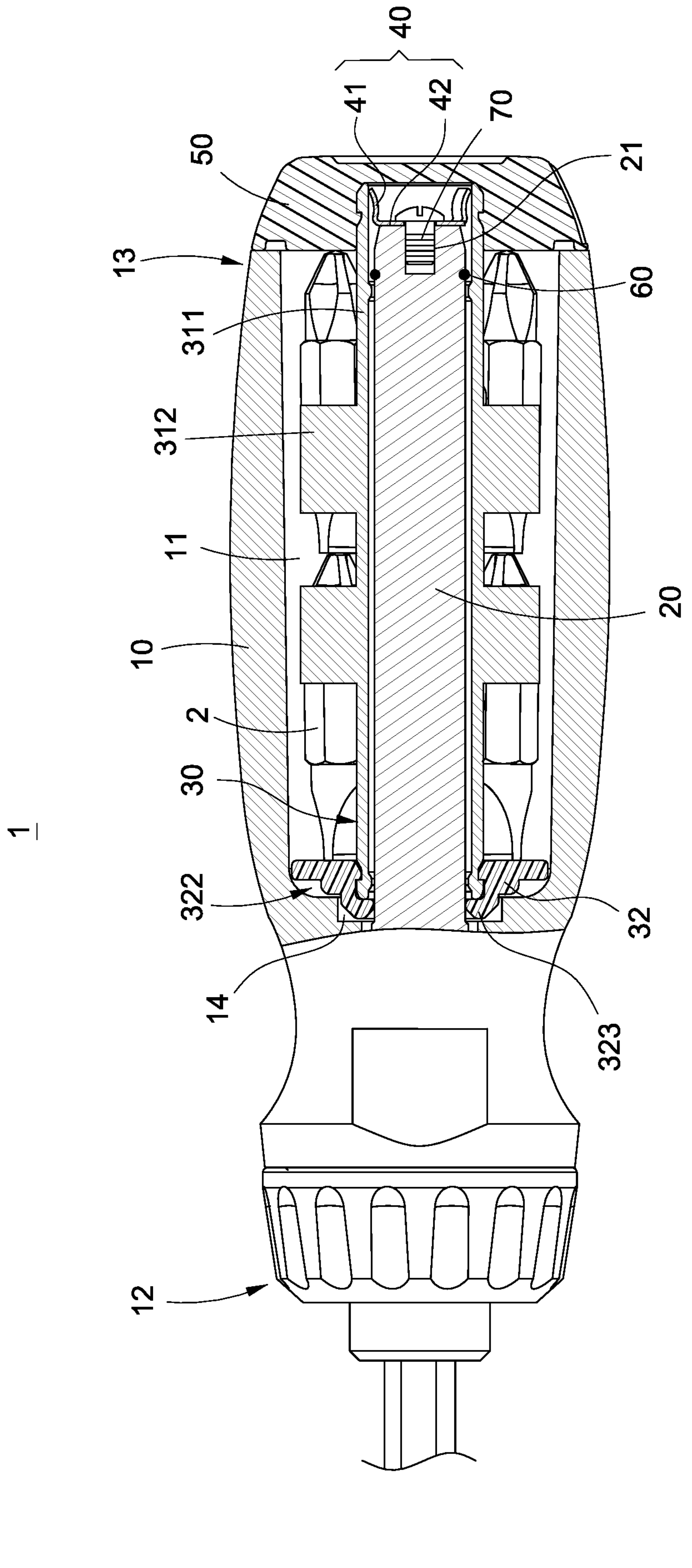
FIG. 4 is a cross-sectional view taken along line 4-4 in FIG. 3.

Please refer to FIG. 1 to FIG. 4. FIG. 1 is a perspective view of a combined screwdriver of the present disclosure. FIG. 2 is a perspective exploded schematic diagram of the combined screwdriver of the present disclosure. FIG. 3 is a schematic plan view of the combined screwdriver of the present disclosure after being assembled. FIG. 4 is a cross-sectional view taken along line 4-4 in FIG. 3. The combined screwdriver 1 of the present disclosure includes a handle 10, a rod 20, a storage assembly 30, an abutting piece 40, and a cap 50. The rod 20 is inserted into the handle 10. The storage assembly 30 and the abutting piece 40 are combined on the rod 20. The cap 50 is connected to one end of the handle 10 to form the combined screwdriver 1. Some structures of the combined screwdriver 1 are described in more detail as follows.

The handle 10 includes a cavity 11, a working end 12, and a storage end 13. The working end 12 and the storage end 13 are located on opposite sides of the cavity 11.

The rod 20 is arranged in the cavity 11, one end of the rod 20 connects to the handle 10, and the other end of the rod 20 includes a positioning part 21.

The storage assembly 30 is housed in the cavity 11, the storage assembly 30 includes a storage seat 31 and a stopper seat 32 combined with one end of the storage seat 31. The stopper seat 32 and the storage seat 31 are jointly sleeve on the rod 20. The storage seat 31 includes a sleeve 311 and a plurality of elastic clips 312 connected to the sleeve 311, and the sleeve 311 is moved out of the cavity 11 relative to the rod 20.

In an embodiment of the present disclosure, the plurality of elastic clips 312 are arranged on two opposite sides of the sleeve 311 at intervals, and the plurality of elastic clips 312 are arranged in pairs on an outer edge surface of the sleeve 311 at intervals. The plurality of elastic clips 312 adjacent to each other are arranged in a V shape.

Specifically, the sleeve 311 of the storage seat 31 has a convex ring 310, and a concave groove 320 is formed on an inner surface of the stopper seat 32. The concave groove 320 and the convex ring 310 are buckled with each other so that the stopper seat 32 is combined with the sleeve 311. In addition, a flange 323 is formed at a front end of the stopper seat 32. The stopper seat 32 and the storage seat 31 are jointly sleeved on the rod 20 and accommodated in the cavity 11 of the handle 10, and the flange 323 abuts against the rod 20.

In an embodiment of the present disclosure, the stopper seat 32 includes a plurality of concentric ring pieces 321 with different diameters. The plurality of concentric ring pieces 321 are arranged in order of diameter and connected at bottom edges thereof to form a stepped outer edge 322. A stepped part 14 is correspondingly formed on one side of the handle 10 close to the working end 12. A shape of the stepped part 14 corresponds to the stepped outer edge 322 of the stopper seat 32 to accommodate the stopper seat 32.

Furthermore, the abutting piece 40 is fixed on the positioning part 21 of the rod 20, and the abutting piece 40 includes a plurality of elastic pieces 41, one end of the plurality of elastic pieces 41 elastically abuts against an inner surface of the sleeve 311. The cap 50 detachably combines on the storage end 31, and covers the cavity 11 of the handle 10.

In an embodiment of the present disclosure, the combined screwdriver 1 further includes a washer 60. An outer edge of the rod 20 includes a ring groove 22. The washer 60 is buckled on the ring groove 22 to reduce a gap between the rod 20 and the sleeve 311 so that the sleeve 311 may move out of the handle 10 along the rod 20 more smoothly.

In an embodiment of the present disclosure, the combined screwdriver 1 further includes a screw 70. The rod positioning part 21 is a screw hole provided on an end surface of the rod 20. The abutting piece 40 includes a bottom plate 42 connecting the plurality of elastic pieces 41, and the bottom plate 42 includes a through hole 420. Accordingly, the abutting piece 40 is combined with the positioning part 21 to be fixed on the rod 20 by the screw 70 passes through the through hole 420.

Accordingly, after the combined screwdriver 1 of the present disclosure is assembled as described above, the plurality of screwdriver heads 2 may be clamped between the plurality of elastic clips 312 of the storage seat 31 to be accommodated in the cavity 11 of the handle 10.

Figure 5:
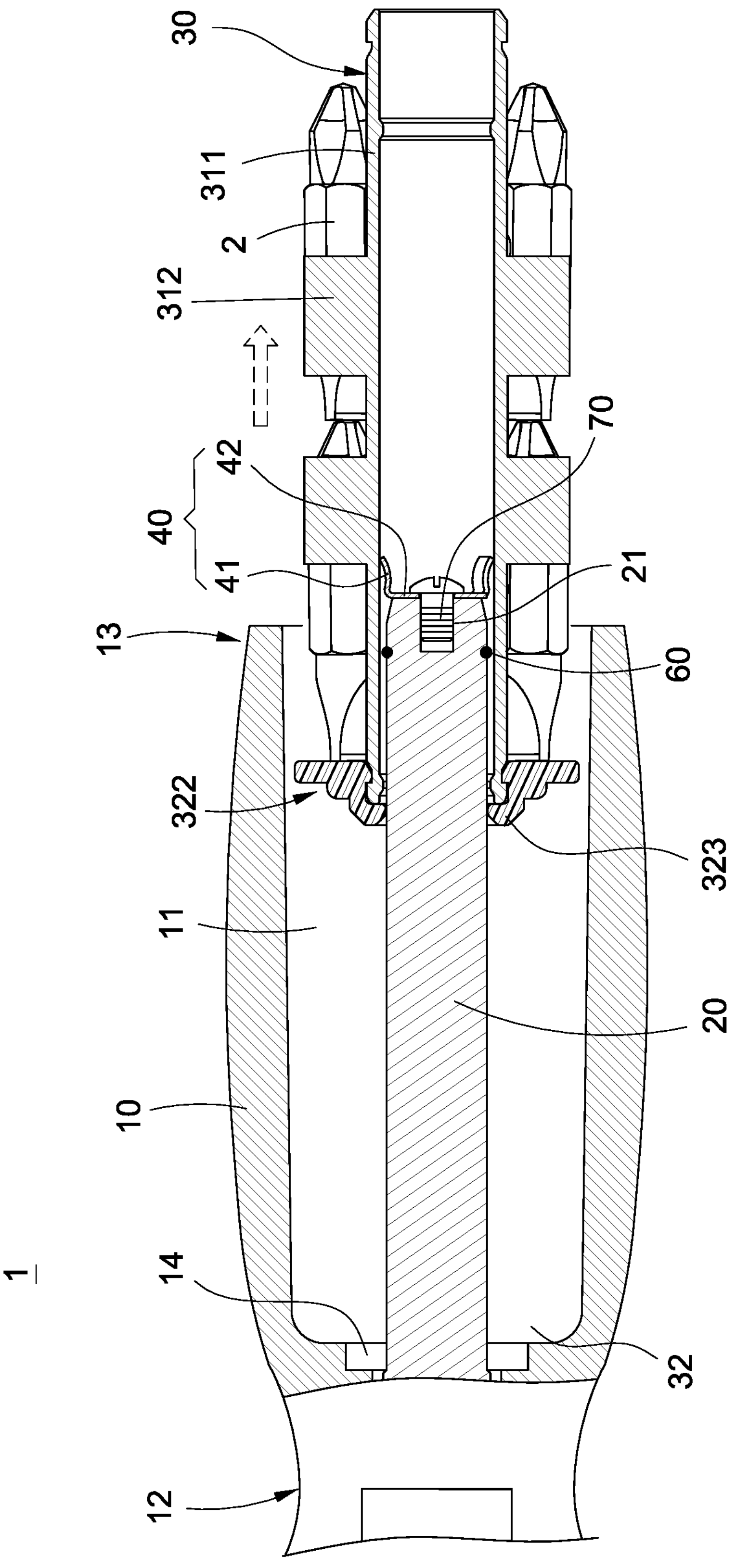
FIG. 5 is a schematic diagram of a storage seat of the present disclosure, which is moved out of a handle.

Please refer to FIG. 5, which is a schematic diagram when a storage seat of the present disclosure is moved out of a handle. When the screwdriver head 2 stored in the handle 10 is to be taken out. First, the cap 50 combined with the grip 10 is removed, and then a force is applied to the receiving seat 31, so that the storage seat 31 is smoothly moves out of the handle 10 along the rod 20.

It should be noted that when the storage seat 31 is moved out of the handle 10, the plurality of elastic pieces 41 of the abutting piece 40 will continue to elastically abut the inner surface of the sleeve 311, thereby preventing the sleeve 311 from moving, so as to prevent the sleeve 311 from shaking during the sleeve 311 is moved.

It is also worth noting that the stopper seat 32 combined with the sleeve 311 also moves with the storage seat 31. An outer edge of the stopper seat 32 abuts against an inner surface of the cavity 11 and provides a supporting force. In addition, the flange 323 of the stopper seat 32 and the plurality of elastic pieces 41 of the abutting piece 40 respectively press against the two ends of the rod 20, thereby increasing a stability during a movement of the sleeve 311. Therefore, when the storage seat 31 is moved out of the handle 10, there will be no violent shaking.

Figure 6:
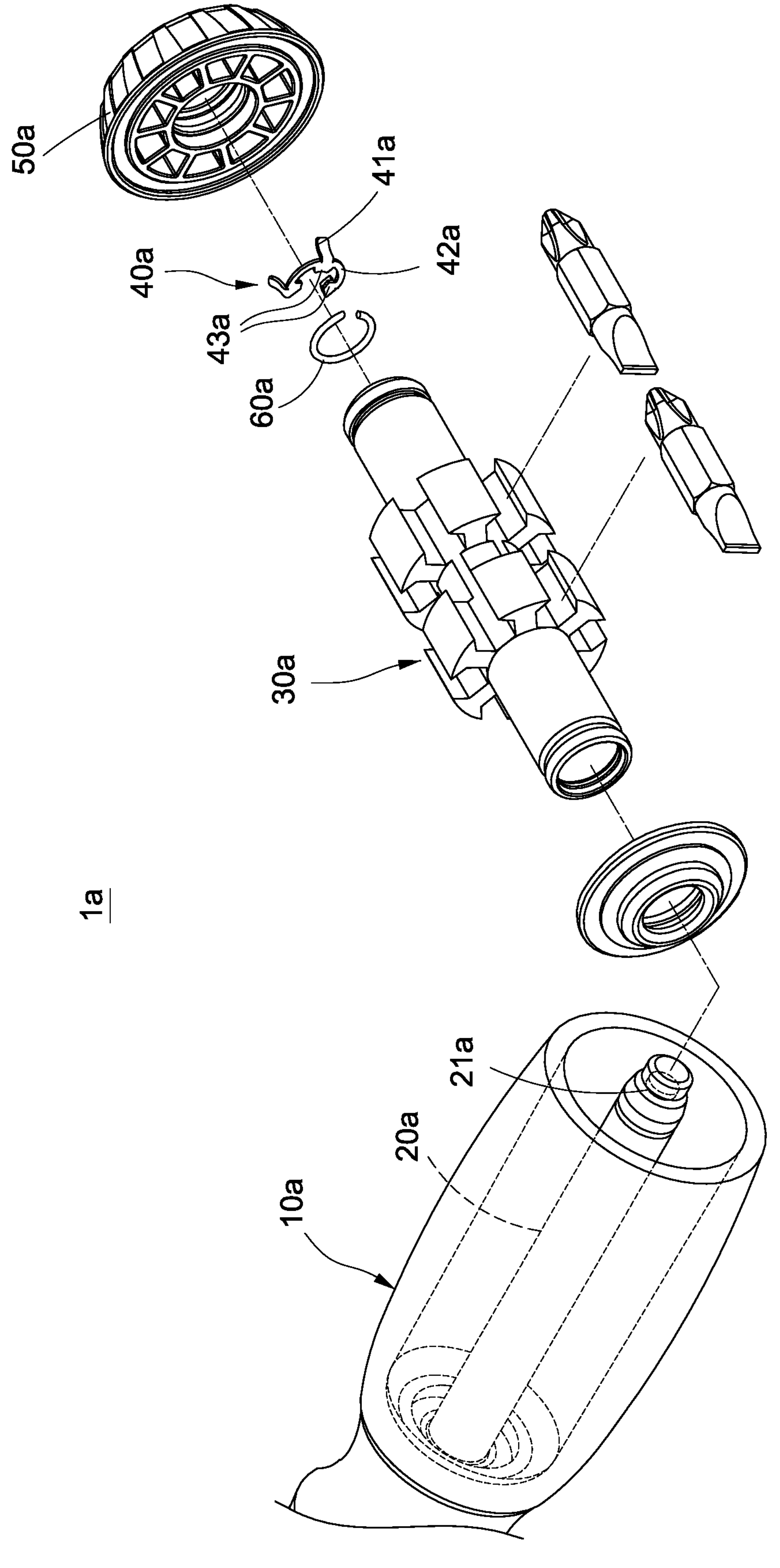
FIG. 6 is a perspective exploded schematic diagram of another embodiment of the combined screwdriver of the present disclosure.
Figure 7:
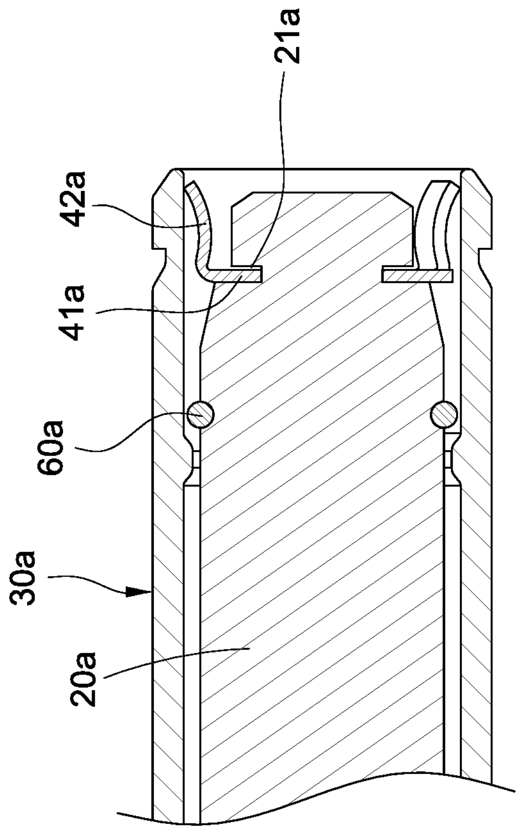
FIG. 7 is a combined cross-sectional view of an abutting piece of another embodiment of the combined screwdriver of the present disclosure.

Please refer to FIG. 6 and FIG. 7. FIG. 6 is a perspective exploded schematic diagram of another embodiment of the combined screwdriver of the present disclosure. FIG. 7 is a combined cross-sectional view of an abutting piece of another embodiment of the combined screwdriver of the present disclosure. As shown in the figures, the combined screwdriver 1*a* includes a handle 10*a*, a rod 20*a*, a storage assembly 30*a*, an abutting piece 40*a*, a cap 50*a*, and a washer 60*a*. This embodiment is substantially the same as the previous embodiment, and the similarities are not repeated here. The difference between this embodiment and the previous embodiment is a fixing method of the abutting piece 40*a*.

The rod 20*a* has a positioning part 21*a*. In this embodiment, the positioning part 21*a* is a card slot, the abutting piece 40*a* includes a C-shaped buckle 42*a* connecting the plurality of elastic pieces. The abutting piece 40*a* is fixed on the rod 20*a* by the C-shaped buckle 42*a* passing through the positioning part 21*a*.

It is worth noting that an inner edge of the C-shaped buckle 42*a* includes a plurality of concave and convex pars 43*a* arranged at intervals. An arrangement of the plurality of concave and convex pars 43*a* may increase a clamping force of the C-shaped buckle 42*a*, so that the abutting piece 40*a* may be reliably fixed on the positioning part 21*a*.

Some technical contents are only some embodiments of the present disclosure, and is not used to limit the scope of the present disclosure. Any modification of the structure, the change of the proportional relationship, or the adjustment of the size should be within the scope of the technical contents disclosed by the present disclosure without affecting the effects and the achievable effects of the present disclosure.

What is claimed is:

1. A combined screwdriver with storage structure, the combined screwdriver comprising:

a handle, comprising a cavity, a working end, and a storage end, wherein the working end and the storage end are located on opposite sides of the cavity;

a rod, arranged in the cavity, one end of the rod configured to connect to the handle, and an end surface of the other end of the rod formed a screw hole;

a storage assembly, housed in the cavity, the storage assembly comprising a storage seat and a stopper seat combined with one end of the storage seat, the stopper seat and the storage seat configured to jointly sleeve on the rod, the storage seat comprising a sleeve and a plurality of elastic clips connected to the sleeve, and the sleeve configured to move out of the cavity relative to the rod;

an abutting piece, fixed on the rod, and the abutting piece comprising a bottom plate connecting a plurality of elastic pieces, one end of each elastic piece configured to elastically abut against an inner surface of the sleeve;

a screw, the abutting piece configured to be fixed on the end surface of the rod by the screw passing through a through hole of the bottom plate; and a cap, configured to detachably combine on the storage end, and configured to cover the cavity, wherein the stopper seat comprises a plurality of concentric ring pieces with different diameters, the plurality of concentric ring pieces are arranged in order of diameters and connected at bottom edges thereof to form a stepped outer edge, and a stepped part is correspondingly formed on a bottom surface of cavity close to the working end;

wherein the sleeve comprises a convex ring, and a concave groove is formed on an inner surface of the stopper seat, the concave groove and the convex ring are configured to buckle with each other so that the stopper seat is combined with the sleeve.

2. The combined screwdriver with storage structure in claim 1, wherein a flange is formed at a front end of the stopper seat, the flange and the plurality of elastic pieces configured to respectively abut against two ends of the rod.

3. The combined screwdriver with storage structure in claim 1, wherein the plurality of elastic clips are arranged on two opposite sides of the sleeve at intervals, and the plurality of elastic clips are arranged in pairs on an outer edge surface of the sleeve at intervals.

4. The combined screwdriver with storage structure in claim 3, wherein the plurality of elastic clips adjacent to each other are arranged in a V shape.

5. The combined screwdriver with storage structure in claim 1, further comprising a washer, an outer edge of the rod comprising a ring groove, and the washer configured to snap on the ring groove.

* * * * *